United States Patent
Bayliss et al.

Patent Number: 5,847,494
Date of Patent: Dec. 8, 1998

[54] CORONA DISCHARGE REACTOR

[75] Inventors: Keith Howard Bayliss, Bridgnorth; John Sydney Carlow, Southampton, both of United Kingdom

[73] Assignee: AEA Technology plc, Didcot, United Kingdom

[21] Appl. No.: 979,869

[22] Filed: Nov. 26, 1997

Related U.S. Application Data

[63] Continuation of Ser. No. 307,433, Sep. 19, 1994, abandoned.

[30] Foreign Application Priority Data

Oct. 7, 1993 [GB] United Kingdom ............... 9320662

[51] Int. Cl.$^6$ .................... C01B 13/10; B01J 19/08
[52] U.S. Cl. .................. 313/231.31; 313/231.71; 250/324; 204/176; 422/186.04; 422/907
[58] Field of Search ............. 313/231.31, 231.41, 313/231.51, 231.71, 362.1, 325, 356; 250/324, 369 ML, 426, 432 R, 428, 492.3; 204/157.44, 156, 176, 178, 164; 315/111.21, 111.41, 111.91, 111.71; 422/186.03, 186.04, 186.22, 907, 186.18; 361/120

[56] References Cited

U.S. PATENT DOCUMENTS

| | | | |
|---|---|---|---|
| 1,579,162 | 3/1926 | Starke et al. | 422/186.16 X |
| 3,348,041 | 10/1967 | Rosenthal | 250/324 |
| 3,979,193 | 9/1976 | Sikich | 422/186.04 X |
| 4,090,960 | 5/1978 | Cooper | 204/176 X |
| 4,966,666 | 10/1990 | Waltonen | 204/164 |
| 5,041,145 | 8/1991 | Kakinuma | . |
| 5,124,132 | 6/1992 | Francis, Jr. et al. | 422/186.03 X |
| 5,268,151 | 12/1993 | Reed et al. | 422/186.18 X |

FOREIGN PATENT DOCUMENTS

| | | | |
|---|---|---|---|
| 0194539 | 9/1986 | European Pat. Off. | . |
| 0396249 | 11/1990 | European Pat. Off. | . |
| 5159861 | 6/1993 | Japan | 250/324 |
| 1465412 | 3/1989 | U.S.S.R. | 204/176 |
| 12501158 | 5/1989 | U.S.S.R. | 315/111.21 |
| 211125 | 6/1925 | United Kingdom | . |
| 1528731 | 10/1978 | United Kingdom | . |
| 2008369 | 5/1979 | United Kingdom | . |

*Primary Examiner*—Ashok Patel
*Attorney, Agent, or Firm*—D. Peter Hochberg; William R. Hinds; William H. Holt

[57] ABSTRACT

A corona discharge reactor which has a central electrode in the form of a metal rod with radial projections and a cylindrical outer electrode surrounding the inner electrode.

8 Claims, 3 Drawing Sheets

CORONA DISCHARGE REACTOR

This is a continuation of application Ser. N. 08/307,433 filed Sep. 19, 1994, now abandoned.

FIELD OF THE INVENTION

BACKGROUND OF THE INVENTION

The present invention relates to reactors for the processing of materials in the gaseous phase by means of corona discharges.

Considerable effort is being expended on the development of techniques for carrying out processes in the gaseous phase, using species which have been activated by corona discharges. Corona discharges occur in gaseous media when the localised electric field in the neighbourhood of a body exceeds the electrical breakdown voltage of the gaseous medium. Existing corona discharge reactors consist of a chamber having an inlet and an outlet for a gaseous medium, an axial wire inner electrode and a cylindrical outer electrode surrounding the inner electrode. The electrical discharge within such reactors consists of streamers extending from the inner electrode towards the outer electrode. For the effective processing of a gaseous medium passing through the reactor, it is necessary to produce as many corona streamers as possible because any space which does not contain such streamers is dead space as far as the processing of the gaseous medium is concerned.

Unfortunately, the rapid fall-off in the electric field in a central wire electrode type of corona discharge reactor means that the corona discharge streamers propagate only a short distance from the central wire. This phenomenon restricts the diameter of a practicable reactor to a few centimeters. It is not practicable to compensate for this by increasing the length of the reactor because of the lack of mechanical strength of the inner electrode. Thus existing corona discharge reactors have diameters of a few centimeters and lengths of a few tens of centimeters. As a result, to process reasonable volumes of gas, high flow rates are required, which in turn tend to increase the mechanical instability of the central electrode due to aerodynamic effects as well as leading to short residence times in the reactor chamber of the medium to be processed. Hence, existing corona discharge reactors are limited inherently in their effectiveness.

It is an object of the present invention to provide an improved form of corona discharge reactor for use in the processing of gaseous media by means of electrically activated species.

SUMMARY OF THE INVENTION

According to the present invention there is provided a corona discharge reactor for use in the processing of materials, comprising a reactor chamber through which a gaseous medium to be processed can be caused to flow, a central electrode mounted axially within the chamber and a cylindrical outer electrode surrounding the inner electrode, wherein the central electrode comprises a rod having one or more radially extending projections.

The radially extending projections may take the form of a sharp-edged helix formed on the surface of the rod in the manner of a screw thread. Alternatively, the radially-extending projections can be in the form of parallel fins either machined in the surface of the rod, or the central rod can be fabricated from a stack of disks and spacers of smaller diameter. In a further variant, the spaces between radially-extending projections is filled with a ceramic or other high dielectric constant material having the same diameter as the radially extending projections. In this case, the corona discharge streamers will form at the outer edges of the interfaces between the ceramic and metal portions of the central electrode.

BRIEF DESCRIPTION OF THE DRAWINGS

The invention will now be described, by way of example, with reference to the accompanying drawings, in which.

DESCRIPTION OF PREFERRED EMBODIMENTS

Figure 1:
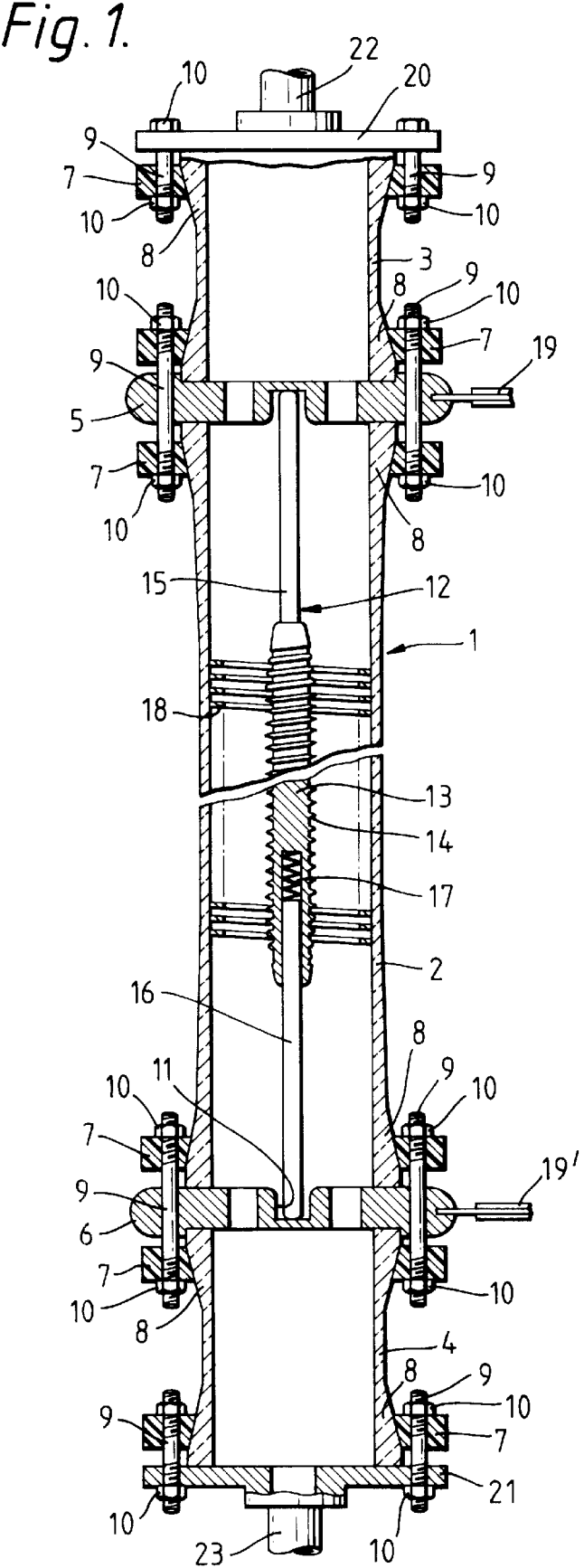
FIG. 1 is a longitudinal section of an embodiment of the invention.

Referring to FIG. 1, a corona discharge reactor consists of a cylindrical reactor chamber 1 formed by a borosilicate glass cylinder 2 with upper and lower extensions 3 and 4, respectively. Situated between the cylinder 2 and the upper and lower extensions 3 and 4 are two metal spiders 5 and 6, respectively. The assembly is clamped together by means of annular collars 7 which seat on tapers 8 formed at the ends of the cylinder 2, studs 9 and nuts 10, as is common practice in the chemical art. The spiders 5 and 6 have inwardly-facing central recesses 11 which locate a central electrode 12. The electrode 12 is in the form of a metal rod the surface of a central portion 13 of which has its surface machined to provide a sharp-edged helical projection 14 standing approximately 0.5 cm above the overall surface of the central portion 13 of the electrode 12 with a pitch of 1 cm. To ensure mechanical stability as well as to allow for variations in the dimensions of the apparatus arising from thermal expansion of the apparatus in use, the electrode 12 is in two telescopic portions 15 and 16, which are urged against the spiders 5 and 6 by a spring 17. The ends of the central portion 13 of the portion 15 of the electrode 12 are tapered to prevent arcing over. The central portion 13 of the electrode 12 is surrounded by an outer electrode 18 in the form of a metal helix having the same radial extension and pitch as the helical projection 14 on the central portion 13 of the electrode 12. The separation between the edges of the helices 14 and 18 is 3 cm. The spider 5 is provided with a high voltage terminal 19, and the spider 6 is provided with a terminal 19' by means of which it can be grounded. The collars 7, studs 9 and nuts 10 associated with the spider 5 are covered with a shield (not shown) to prevent discharges from their edges. Alternatively they can be made of an insulating material such as that known as TUFNOL (Trade Mark).

The upper and lower extensions 3 and 4 are attached to respective end-caps 20 and 21 by a similar arrangement of tapers, collars and nuts and bolts as are the cylinder 2 and upper end lower extensions 3 and 4. The same reference numerals as before are used. The end caps 20 and 21 have associated axial inlet and outlet ports 22 and 23, respectively.

Figure 2:
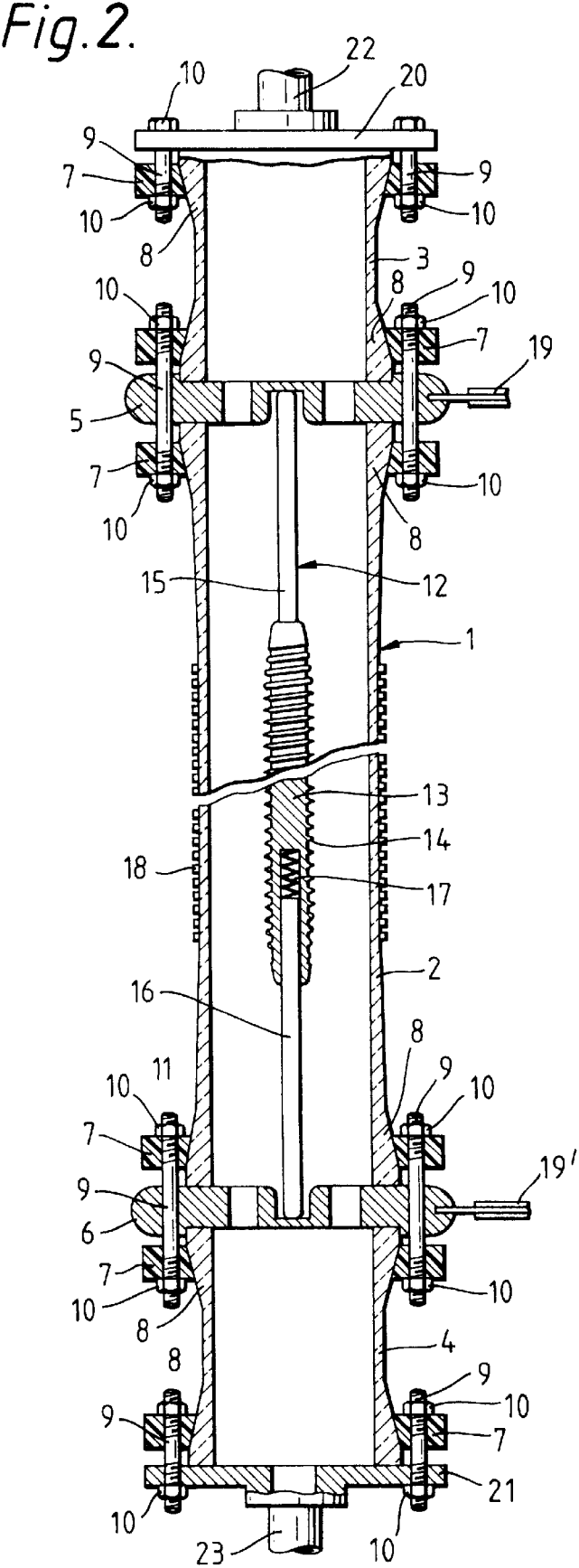
FIG. 2 is a longitudinal section of a second embodiment of the invention.

FIG. 2 shows another form of the apparatus in which the outer electrode 18 is placed on the outside of the chamber 1.

In this case, the outer electrode does not have to project radially. It can be in the form of a helix of strip metal, a mesh, or a solid cylinder, or the outer surface of the cylinder 2 can be metallised sufficiently to make it electrically conducting. Other components of the apparatus which are the same as the corresponding components of the embodiment of the invention described with reference to FIG. 1 have the same reference numerals. An advantage of this arrangement is that a pulsed voltage can be applied to the outer electrode rather than the inner electrode. The reactor then acts as its own fast acting switch.

Figure 3A:
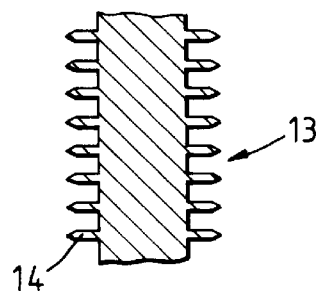
FIG. 3(a) is a longitudinal section of a portion of another form of central electrode embodying the invention.
Figure 3B:
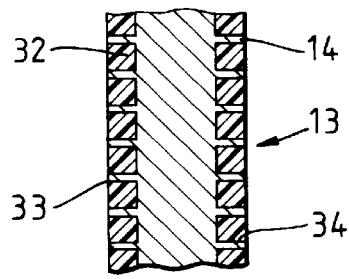
FIG. 3(b) is a longitudinal section of a portion of another form of central electrode embodying the invention.

Instead of the electrode 12 having a single helical projection, it can have a series of parallel fins. Such a form of central electrode is shown in FIG. 3(a). In this case, as in the embodiments previously described the electrode 12 can be a single piece of metal machined to the desired configuration, or it can be assembled from a stack of disks and spacers. Another form of central electrode has the space between successive turns of the helical projection 14 or separate fins 31, filled with a ceramic 32 having the same external diameter as the helical projection or fins, as is shown in FIG. 3(b). In this case, the corona emission takes place at the exposed edges 33 of the interfaces 34 between the metal projection 14 or fins 31 and ceramic portions 32. Other forms of high dielectric constant, or even semiconducting, material can be used instead of the ceramic 32. Also, the fins 31 can project slightly beyond the in-filling material.

Figure 4:
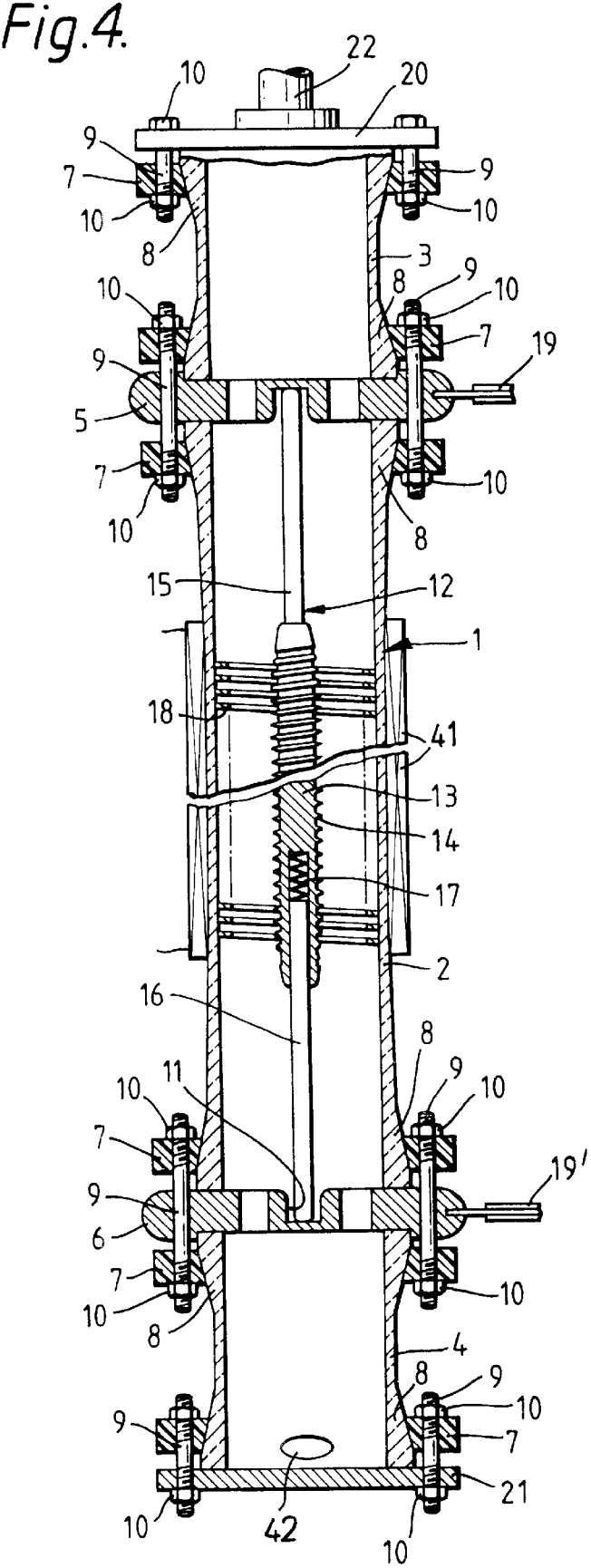
FIG. 4 is a longitudinal section of another embodiment of the invention.

The residence time of the gaseous medium in the reactor and the efficiency of the interaction between the gaseous medium and the streamers of the corona discharge can be increased by imparting a tangential component to the flow of the gaseous medium as it passes through the reactor. This can be done by means of a rotating paddle in the extension 4 which acts as a plasma chamber to the reactor main chamber 1, suitably positioned vanes in the extension 4 or in the gaps in the spider 6, or, as shown in FIG. 4, by replacing the axial inlet 23 with a tangential inlet 42.

Another way in which the efficiency of the interaction between the streamers of the corona discharge and the gaseous medium can be improved is to increase the length of the corona discharge streamers. This can be done by providing an axial magnetic field in that region of the reactor chamber 1 in which the corona discharge occurs. The effect of the magnetic field is to bend the corona discharge streamers in the planes in which they occur, so increasing their length. The magnetic field can be provided by a solenoid such as that shown in FIG. 4 with the reference numeral 41, or by an array of fixed magnets. By the use of modem cermet magnets, relatively high magnetic fields, of the order of 1 Tesla at the wall of the reactor chamber 1 can be achieved readily.

We claim:

1. A corona discharge reactor for use in the processing of gaseous materials, comprising a reactor chamber through which a gaseous medium to be processed can be caused to flow, a first electrode within the chamber comprising an axially extending rod at least a portion of which has an effective plurality of radially extending projections, and a second electrode within the chamber surrounding that portion of the first electrode which has the effective plurality of radially extending projections, the surfaces of the said electrodes being exposed directly to each other, and the second electrode being fixed relative to the first electrode, electrically insulated and spaced apart therefrom, wherein to provide between the said first and second electrodes a path for flow of the said gaseous medium through the reactor chamber and wherein to support a corona discharge when an electric potential is applied across the electrodes.

2. A corona discharge reactor according to claim 1 wherein the second electrode has mirrored projections positioned opposite the radially extending projections on the first electrode.

3. A corona discharge reactor according to claim 2 wherein the projections on the first and second electrodes comprise matching helices.

4. A corona discharge reactor according to claim 1 wherein there is provided means for imparting a tangential component to the flow of the gaseous medium through the reactor chamber, said means being placed relative to one end of said reactor chamber.

5. A corona discharge reactor according to claim 1 wherein there is provided means for imparting a tangential component to the direction of corona discharge streamers emanating from the first electrode, said means being placed relative to said reactor chamber where the corona discharge occurs.

6. A corona discharge reactor according to claim 5 wherein the means for imparting a tangential component to the direction of corona discharge streamers emanating from the first electrode comprises means for establishing an axial magnetic field in the reactor chamber.

7. A corona discharge reactor according to claim 1 wherein the first electrode has at least two spring loaded telescopic portions.

8. A corona discharge reactor according to claim 1 wherein there is provided a ceramic dielectric material between the radial projections on the rod of the first electrode, the ceramic dielectric material having the same radial extension as the projections on the said rod.

* * * * *